United States Patent
Morgan et al.

(10) Patent No.: US 9,557,414 B1
(45) Date of Patent: Jan. 31, 2017

(54) ULTRA-BROADBAND COHERENT RADAR TRANSPONDER FOR PRECISION TRACKING

(71) Applicants: Donald G. Morgan, Reston, VA (US); Justian A. Neely, Germantown, MD (US); John R. Smith, Frederick, MD (US); Paul M. Haldeman, Jr., Winchester, VA (US)

(72) Inventors: Donald G. Morgan, Reston, VA (US); Justian A. Neely, Germantown, MD (US); John R. Smith, Frederick, MD (US); Paul M. Haldeman, Jr., Winchester, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 386 days.

(21) Appl. No.: 14/168,828

(22) Filed: Jan. 30, 2014

(51) Int. Cl.
*G01S 13/76* (2006.01)
(52) U.S. Cl.
CPC .................................. *G01S 13/767* (2013.01)
(58) Field of Classification Search
CPC ..................................................... G01S 13/767

USPC .......................................................... 342/51
See application file for complete search history.

(56) References Cited

U.S. PATENT DOCUMENTS

| 5,486,830 A | * | 1/1996 | Axline, Jr. | .............. G01S 13/74 342/43 |
| 8,532,235 B2 | | 9/2013 | Dallum et al. | |
| 2011/0175789 A1 | * | 7/2011 | Lee et al. | ............... H01Q 1/243 343/853 |

FOREIGN PATENT DOCUMENTS

EP          133527 A2      8/2003

OTHER PUBLICATIONS

"A Fiber-optic-based Programmable Delay Line", Princeton Electronic Systems Inc., Princeton, NJ, Jul. 1, 1999.*

* cited by examiner

*Primary Examiner* — Peter Bythrow
*Assistant Examiner* — Helena Seraydaryan
(74) *Attorney, Agent, or Firm* — Dave A. Ghatt

(57) ABSTRACT

An ultra-broadband coherent radar transponder for precision tracking, and in particular a transponder arrangement having an antenna, receiver, control logic, delay, and transmitter components arranged to coherently amplify, delay and repeat back a reference signal to be utilized by a microwave radar system for high fidelity tracking.

3 Claims, 2 Drawing Sheets

ULTRA-BROADBAND COHERENT RADAR TRANSPONDER FOR PRECISION TRACKING

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to an ultra-broadband coherent radar transponder for precision tracking, and in particular a transponder arrangement having an antenna section, receiver section, control logic section, delay section, and transmitter section arranged to coherently amplify, delay and repeat back a reference signal to be utilized by a microwave radar system for high fidelity tracking.

BACKGROUND

Radar transponders have been utilized for many applications including missile, aircraft, and ship tracking and navigation for many years. They are generally used to receive, delay, amplify, and retransmit a radar signal to present a strong reference signal to the interrogating radar. However, most were non-coherent, answering back at a fixed frequency different from the radar transmitter. Some coherent units have been developed for missile and satellite tracking applications where knowing the velocity vector is critical to determining flight safety. However, these units are single frequency and have very narrow bandwidths of 10 MHz or less, and are tuned to the radar transmitter frequency which was typically never changed.

Frequency chirp or frequency hopping radar systems require a frequency agile transponder that could keep up with the radars to provide a steady tracking signal. A coherent transponder with approximately 1 GHz bandwidth was developed by the Navy in the early 1990s by expanding the earlier narrow bandwidth surface acoustic wave (SAW) and bulk acoustic wave (BAW) delay line technology with similar wider bandwidth components. Although this Navy unit is useful for applications where the radar frequency band can be confined to that of the transponder, there are applications where the frequency range of the interrogating radar exceeds that transponder's bandwidth.

The bandwidth of older designs is typically the bandwidth of SAW or BAW delay lines. It is desired to have an ultra-broad band transponder that has a bandwidth that covers the entire S, X and Ku microwave bands.

SUMMARY

In one aspect, the invention an ultra-broadband coherent radar transponder for precision tracking. In this aspect, the invention includes an antenna section, a receiver section, and a transmitter section. The antenna section is electrically connected to each of the receiver section and the transmitter section. The ultra-broadband coherent radar transponder also includes a delay section having a radio frequency fiber optic transmitter, and at least one fiber optic cable spool, wherein each of the at least one fiber optic cable spool has a cable length that determines the delay interval, wherein the fiber optic cable spool comprises single mode fiber with a bandwidth capability of up to about 18 GHz. The delay section also includes a fiber optic receiver. In this aspect, the ultra-broadband coherent radar transponder also includes a control logic section having a microcontroller compatible with each of a plurality of preset delay times, the microcontroller programmed to blank the receiver for the preset delay time.

BRIEF DESCRIPTION OF THE DRAWINGS

Other features will be apparent from the description, the drawings, and the claims.

DETAILED DESCRIPTION

Figure 1:
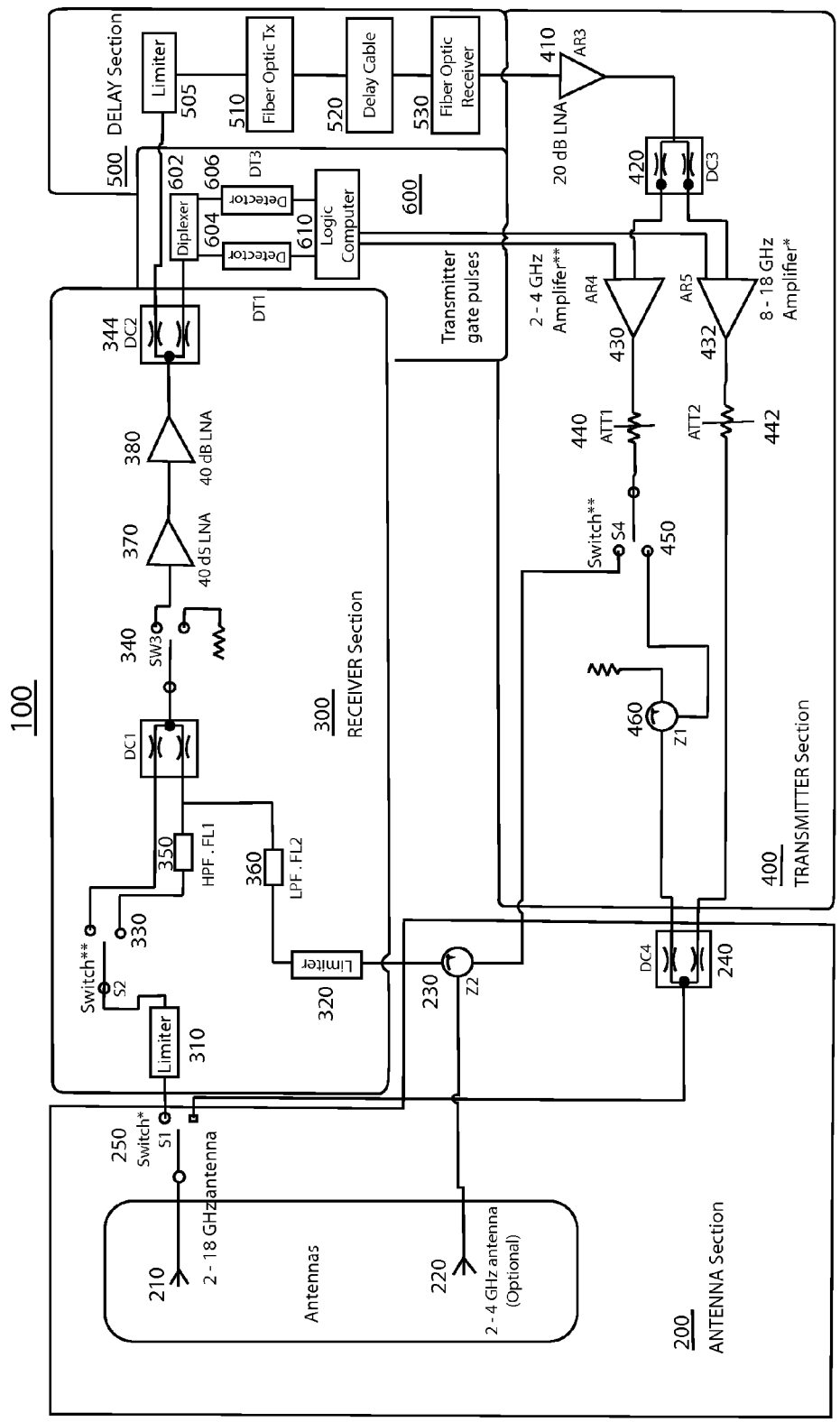
FIG. 1 is a schematic block illustration of an ultra-broadband coherent radar transponder for precision tracking, according to an embodiment of the invention.

FIG. 1 is a schematic block illustration of an ultra-broadband coherent radar transponder 100 for precision tracking, according to an embodiment of the invention. As outlined below, the ultra-broadband coherent radar transponder 100 is designed so that it is phase coherent and will repeat whatever pulse modulation it receives with virtually unlimited bandwidth, as compared to prior art transponders that had limited instantaneous bandwidth and therefore could not replicate all waveforms such as linear chirp. Additionally as outlined below, because the design covers all frequencies in the S, X, and Ku bands, only one transponder 100 is needed for multiple operations. Also, the single transponder 100 has the capability to respond to a number of interrogations during the same time interval at different frequencies, allowing simultaneous tracking from different radar locations. Furthermore, the design's high bandwidth allows about 20 times more precise range tracking when stepped-chirp interrogation waveforms with FFT processing are utilized.

As shown, the transponder 100 includes an antenna section 200, a receiver section 300, and a transmitter section 400, wherein as outlined below, the antenna section 200 is electrically connected to each of the receiver section 300 and the transmitter section 400. As shown, the ultra-band coherent radar transponder 100 also includes a delay 500 section. As outlined below, the delay 500 has a radio frequency fiber optic transmitter 510, and a fiber optic cable spool 520 with a length that determines the delay interval. The fiber optic cable spool 520 is made from a single mode fiber with a bandwidth capability of up to about 18 GHz. As shown, and as outlined below, the delay 500 also includes a fiber optic receiver 530. The transponder 100 also includes a control logic section 600 that is controlled by a microcontroller 610 that as outlined below, controls amplifier and receiver switches and allows for variable settings for delay time, high power amplifier initiation and receiver blanking.

Returning to the antenna section 200, as shown in FIG. 1, the antenna section 200 is electrically connected to each of the receiver section 300 and the transmitter section 400. The antenna section 200 provides a way to receive electromagnetic radar pulses and couples these electromagnetic radar pulses to the receiver section 300. As shown, the antenna section 300 includes a switch 250 which is used to couple radar pulses to the receiver section 300. The switch 250, which is controlled by the microcontroller 610 may also be used to couple pulses from the transmitter section 400 to the antenna section 200. The antenna section 200 also transmits reply pulses transmitted via the transmitter section 400 after a predetermined delay time. According to an embodiment, the antenna section 200 may be tailored to the specific application, but are generally omnidirectional in azimuth with as much elevation coverage at low grazing angles as desired.

The antenna section 200 has two modes of operation, single or dual antenna modes, selected by a transmitter switch 450 outlined below, which is controlled from the exterior of the unit. The design of the antenna section 200 allows for optimization of antenna performance while keeping antenna size to a minimum over the broad operating frequency range. As shown, the antenna section includes a first antenna 210 and a second antenna 220. Antenna 210 may be either a high band only, with about 8 to about 18 GHz capability. Antenna 210 may also be a larger broadband unit that will cover the complete frequency range of about 2 GHz to about 18 GHz. Antenna 220 is a low band design with about 2 GHz to about 4 GHz capability, which can be utilized with a high band only embodiment of antenna 210 for full band performance. The antenna section 200 also includes an RF switch 250, ferrite circulator 230, and directional coupler 240 to direct the RF pulses for the selected mode of operation. For the single-antenna-only mode as related to antenna 210, transmitter outputs are combined and routed to antenna 210. The transmitter outputs are kept separate for the dual antenna mode and routed to their respective antennas. The transmitter switch 450 manipulates the transmitter outputs and determines the mode of operation of the antenna section 200. The transmitter switch 450 may be controlled externally by a user. The RF switch 250 on the other hand is nominally set to receive pulses while waiting for interrogations. After a pulse is received at antenna 210, and subsequently in the microcontroller 610 in the logic section 600, the microcontroller directs the switch 250 to the transmitter side, before the received pulse exits the delay section 500. For the low band side in the antenna section 200, this function is performed by circulator 230.

Signals from the antenna section 200 are routed to the receiver section 300. As shown, the receiver section 300 includes RF limiter diodes 310 and 320, and RF switching 340. Also shown are filters 350 and 360 at the input to amplifiers 370 and 380 to enable the single or dual antenna modes. The receiver section also includes directional couplers 342 and 344. Signals from the antenna section 200 are amplified in the receiver section 300, which also splits the signals in the directional coupler 344 into outputs for the RF Delay section 500, and the digital Logic system 600. This output from the receiver section 300 is split 50/50, with 50% of the signal going to the RF delay section 500 as a delay section pulse, and the remaining 50% going to the control logic section 600, as a logic section pulse. The output from the receiver section 300 is amplified to a level that efficiently modulates the fiber optic delay circuit (510, 520, 530) in the delay section 500 and the diplexer 602, and detector circuits 604 and 606 in the control logic section 600. The gain required can be tailored to individual applications, but according to an embodiment a gain of about 80 dB is sufficient, while maintaining receiver background noise at a minimum.

As stated above, the transmitter section 400 sends reply pulses to the antenna section 200. As outlined below, the logic section 600 controls the signals sent to the transmitter 400, which also receives signals from the delay section 500. As shown, the transmitter section 400 includes a preamplifier 410, a signal splitter 420, power amplifiers 430 and 432, and variable RF attenuators 440 and 442. As shown, the transmitter section 400 also includes a switch 450, and a circulator 460. The power amplifier 430 for low band, and 432 for high band, are gated ON by signals from the logic microcontroller 610 and driven by the preamplifier 410, which may be a low power wideband amplifier, and power splitter 420. Separate amplifiers 430 and 432 are necessary because the transistor technology is specific to the type of band received, i.e., whether it is a high band or a low band. The attenuators 440 and 442 on the output allow the user to adjust the output power and hence the signal levels appearing at the antenna section 200 to optimize the transponder response. Switch 450 on the low band output is provided for mode control and directs the output to either the low band or the broadband antenna.

Regarding the delay section 500, as stated above, 50% of the output signal from the receiver section 300 goes to the delay section 500 as a delay section pulse. In the delay section 500, the signal is initially received by a limiter 505 then a RF fiber optic transmitter 510. As shown, the delay section 500 has a fiber optic cable spool 520, the length of which determines the actual delay. The fiber optic cable spool 520 is between the RF fiber optic transmitter 510 and the RF fiber optic receiver 530. According to this embodiment, the delay system is not frequency-dependent as the RF fiber optic transmitter 510 and the RF fiber optic receiver 530 are rated for up to 18 GHz. The cable in the cable spool 520 is made from a single mode fiber such as SMF-28® fiber for example. The single mode fiber, along with other elements within the delay section 500 such as the transmitter 510 and fiber-optic receiver 530 facilitate the capability of working with bandwidths of up to 18 GHz. According to this embodiment, the cable spool 520 has a length that facilitates a delay of about 5 microseconds.

Within the delay section 500, the RF fiber optic transmitter 510 may use a high efficiency distributed feedback (DFB) laser diode with an operating wavelength of about 1559 nm. The RF pulses may be modulated onto the laser signal. According to this embodiment, the laser provides the requisite amount of power to drive the fiber optic cable with low noise and high dynamic range. According to an embodiment of the invention, the fiber optic cable in the spool 520 has a length that is proportional to the delay, may be a single mode fiber, and may be about 1000 meters, which provides about 5 seconds of delay. Single mode fibers eliminate phase noise caused by different path lengths of individual light rays in the more common multimode fiber. The RF fiber optic receiver 530 may utilize a high-speed, low distortion PIN photo-diode that provides optical to RF conversion for the delayed pulses. It should be noted that since the delay is not frequency dependent and any loss through the delay line is not delay dependent, delays can be adjusted by adjusting the length of the lines/fibers in the spool 520.

Figure 2:
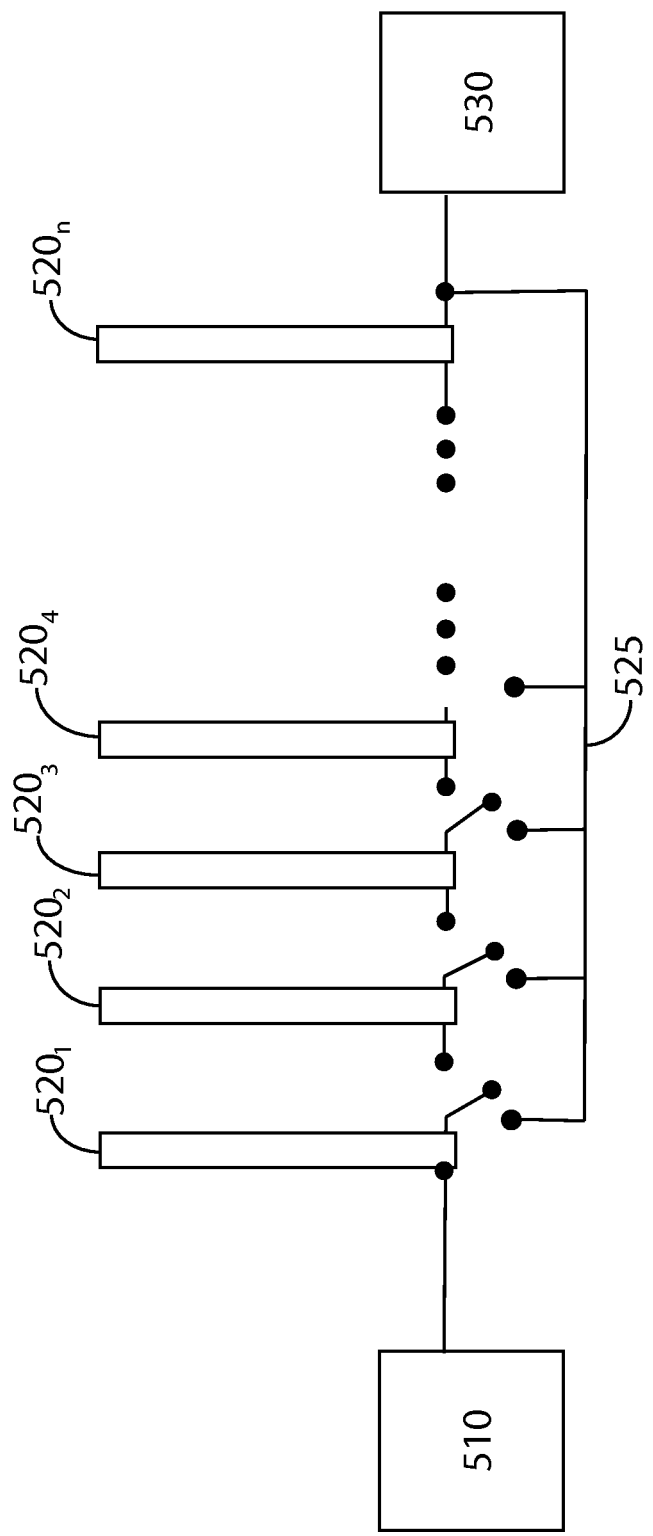
FIG. 2 is an exemplary schematic illustration of a multiple-spooled delay section for manipulating the delay time, according to an embodiment of the invention.

According to an embodiment of the invention, the delay section 500 may include one or more cable spools 520 in a series circuit arrangement, with a complementary fiber optic switching arrangement that connects the one or more cable spools if desired, with the length of the delay dependent upon the number of cable spools that are switched on. FIG. 2 is an exemplary schematic illustration of a multiple-spooled delay section 500 for manipulating the delay time, according to an embodiment of the invention. FIG. 2 shows the delay section having a plurality of spools $520_1$, $520_2$, $520_3$, $520_4$ ... $520_n$ and an associated switching arrangement 525. As shown, the switching arrangement 525 may connect to one or more cable spools if desired, with the length of the delay dependent upon the number of cable spools that are switched on Each spool $520_1$, $520_2$, $520_3$, $520_4$ ... $520_n$ may have any desired length of cable. Thus spools may have equal or different lengths of cable. According to an embodiment of the invention, the spools may be arranged physically in a parallel arrangement, next to each other to minimize the amount of space occupied by the device.

It should be noted that the arrangement in FIG. 2 may have any desired number of spools. Thus, according to one embodiment, the delay section 500 includes a switching system and two cable spools of equal length cable. The switching system may activate one or both of the cable spools 520, with both spools activated via the connection to double the delay time. According to an embodiment of the invention this switching may be performed manually. According to another this switching may be performed automatically.

Returning to FIG. 1, and as outlined above, the transponder 100 also includes a control logic section 600 having a microcontroller 610 that is programmed to control the overall operation of the transponder 100. The microcontroller 610 includes logic to control gate circuits to match the fiber optic delay, according to a particular application. As outlined above, the delay in the fiber-optic spool is accurately known by the total fiber-optic cable length. The microcontroller 610 is then programmed to provide control to switch the switches either during the pulse transit time through the fiber-optic cable or just before it exits. The controller controls receiver switch 340 to block receiver pulses during transmission of transmitter pulses to eliminate self-jamming (ring around). On the transmit side the microcontroller 610 exercises a "gate" control on the transmitters 430 & 432 which applies bias power to the transmitter transistors only for the desired duration of the transmitter pulses. The microcontroller 610 is compatible with each of the plurality of possible preset delay times outlined above. The microcontroller 610 is also programmed to control the high power amplifiers 430 and 432 and receiver switch 340 to control the blanking in the receiver section 300. It should be noted that the microcontroller 610 does not control LNAs 370 and 380, which are "class A" amplifiers and thus voltage bias is continuously applied to their power inputs.

In operation, the microcontroller 610 detects when an incoming pulse is received, and distinguishes via the diplexer 602 whether the incoming pulse is within a high band or a low band frequency range. The microcontroller 610 then initiates the appropriate high powered amplifier, i.e., power amplifier 430 for low band, and 432 for high band. The appropriate power amplifier 430 or 432 is only turned on for the duration of the pulse, preventing unnecessary noise and energy losses. The microcontroller 610 also blanks the receiving signal within the receiver section by switching switch 340 from the rest of the receiver to a 50 ohm load. The receiver section 300 is blanked immediately after the desired pulse is received. The receiver section 300 remains blanked until the pulse travels thorough the fiber line for the preset delay time, to the high power amplifier 430 and 432, and out the antenna section 200 via antennas 210 and/or 220. The receiver blank is lifted only after the reply pulse is transmitted. This prevents noise feed through and ringing of the reply pulse from being amplified and fed back into the transponder 100. The high power amplifiers 430 and 432 are gated ON for the shortest time necessary to turn on the amplifier and transmit the delayed pulse. This prevents extra noise from being transmitted other than the desired return pulse and also to minimize the DC current draw of the amplifier.

As stated above, the receiver section 300 is blanked immediately after the desired pulse is received. According to an embodiment of the invention, this desired pulse may be for example, nominally between 0.2 and 2.5 microseconds in width. The timing of the receiver blanking pulse leading edge is set by the microcontroller 610 and can be reprogrammed as desired. According to this embodiment, with a maximum received pulse width of 2.5 microseconds, the receiver blanking would be set to initiate between 2.5 and 3.0 microseconds and last until the transmitter pulse completely exits the antenna section 200. This setting provides ample time assuming a delay of 5 microseconds or greater is being used in the fiber-optic delay cable 520. For shorter delays the maximum allowed impulse width would be correspondently shorter.

What has been described and illustrated herein are preferred embodiments of the invention along with some variations. The terms, descriptions and figures used herein are set forth by way of illustration only and are not meant as limitations. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. An ultra-broadband coherent radar transponder for precision tracking comprising:
    an antenna section comprising;
        a high band antenna operating in one of a frequency band of about 8 GHz to about 18 GHz, or a frequency band of about 2 GHz to about 18 GHz, and
        a low band antenna operating in a frequency band of about 2 GHz to about 4 GHz, wherein the antenna section operates either single mode or dual mode,
    a receiver section;
    a transmitter section comprising;
        a low band amplifier,
        a high band amplifier, and
        a transmitter switch downstream of the low band amplifier, the transmitter switch providing mode control by directing the low band output to either the low band antenna or the high band antenna, wherein the antenna section is electrically connected to each of the receiver section and the transmitter section;
the ultra-broadband coherent radar transponder further comprising:
    a delay section comprising;
        a radio frequency fiber optic transmitter,
        at least one fiber optic cable spool, wherein each of the at least one fiber optic cable spool has a cable length that determines a preset delay time, wherein the fiber optic cable spool comprises single mode fiber with a bandwidth capability of up to about 18 GHz, and
        a fiber optic receiver section;
the ultra-broadband coherent radar transponder further comprising:
    a control logic section having a microcontroller compatible with each of a plurality of preset delay times, said microcontroller programmed to blank the receiver for said preset delay time, wherein the receiver section is electrically connected to each of delay section and the logic section so that the output from the receiver section is split, with 50% going to the delay section as a delay section pulse and the remaining 50% going to the control logic section as a logic section pulse, and wherein the microcontroller in the control logic section is programmed to detect when a logic section pulse is received from the receiver section, and distinguishes whether said logic section pulse is within a high band or a low band frequency range, and selects and initiates the low band amplifier in the transmitter if said logic section pulse is in a low band frequency ranger, or selects and initiates the high band amplifier in the transmitter if said logic section pulse is in a high band frequency range, and wherein the microcontroller is further programmed to blank the signal within the receiver section, wherein said blanking is initiated when the microcontroller receives a desired logic section pulse, and wherein said blanking continues until said delay section pulse travels through the at least one fiber optic cable spool for said preset delay time, to the selected amplifier, and out the antenna section.

2. The ultra-broadband coherent radar transponder for precision tracking of claim 1, wherein the microcontroller is programmed to control the gating of the high and low band amplifiers in the transmitter section to match the delay created by the at least one fiber optic cable spool in the delay section.

3. The ultra-broadband coherent radar transponder for precision tracking of claim 2, wherein the at least one fiber optic cable spool comprise a plurality of cable spools in a series circuit arrangement, the ultra-broadband coherent radar transponder further comprising a fiber optic switching arrangement that connects the plurality of cable spools, wherein the length of the delay dependents upon the number of cable spools that are switched on by the fiber optic switching arrangement.

* * * * *